US011442300B2

(12) United States Patent
Todd et al.

(10) Patent No.: US 11,442,300 B2
(45) Date of Patent: *Sep. 13, 2022

(54) VEHICLE MOUNTED VIRTUAL VISOR SYSTEM AND METHOD THEREOF

(71) Applicant: Robert Bosch GmbH, Stuttgart (DE)

(72) Inventors: Ryan P. Todd, Plymouth, MI (US); Jason Zink, Milford, MI (US); Andy Woodrich, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 104 days.

This patent is subject to a terminal disclaimer.

(21) Appl. No.: 15/961,105

(22) Filed: Apr. 24, 2018

(65) Prior Publication Data

US 2018/0314092 A1  Nov. 1, 2018

Related U.S. Application Data

(60) Provisional application No. 62/490,805, filed on Apr. 27, 2017.

(51) Int. Cl.
*G02F 1/133* (2006.01)
*G06T 7/73* (2017.01)
(Continued)

(52) U.S. Cl.
CPC ............ *G02F 1/13318* (2013.01); *B60J 3/04* (2013.01); *G02F 1/137* (2013.01); *G06F 3/013* (2013.01);
(Continued)

(58) Field of Classification Search
CPC ........ B60J 3/04; G02F 1/13318; G02F 1/137; G02F 2001/13312; G06F 3/013;
(Continued)

(56) References Cited

U.S. PATENT DOCUMENTS

| 2003/0169213 A1* | 9/2003 | Spero | G02B 5/20 345/7 |
| 2006/0140502 A1* | 6/2006 | Tseng | B60J 3/04 382/275 |

(Continued)

FOREIGN PATENT DOCUMENTS

| CN | 202264622 U | 6/2012 |
| CN | 105652503 A | 6/2016 |

(Continued)

OTHER PUBLICATIONS

International Search Report corresponding to International Patent Application No. PCT/EP2018/060278 (3 pages).

*Primary Examiner* — James T Boylan
(74) *Attorney, Agent, or Firm* — Maginot, Moore & Beck LLP

(57) ABSTRACT

A system for a vehicle comprises a medium arranged in front of a target in the vehicle, a target monitoring system arranged in front of the target in the vehicle capturing an image or a profile of the target, and a processing unit communicatively coupled the target monitoring camera to the medium, analyzed the captured image or profile of the target, wherein the processing unit arranged to analyze the obtained images or profile of the target and cause the medium to switch from a transparent mode to an opaque mode.

13 Claims, 2 Drawing Sheets

(51) Int. Cl.
*B60J 3/04* (2006.01)
*G02F 1/137* (2006.01)
*G06F 3/03* (2006.01)
*G06F 3/01* (2006.01)
*G06V 20/59* (2022.01)

(52) U.S. Cl.
CPC ............ *G06F 3/0304* (2013.01); *G06T 7/73* (2017.01); *G06V 20/597* (2022.01); *G02F 1/13312* (2021.01); *G06T 2207/30201* (2013.01); *G06T 2207/30268* (2013.01)

(58) Field of Classification Search
CPC .............. G06F 3/0304; G06K 9/00845; G06T 2207/30201; G06T 2207/30268; G06T 7/73
See application file for complete search history.

(56) References Cited

U.S. PATENT DOCUMENTS

| | | |
|---|---|---|
| 2006/0175859 A1 | 8/2006 | Isaac |
| 2010/0092031 A1* | 4/2010 | Bergeron ............ G06K 9/2018 382/103 |
| 2013/0146234 A1* | 6/2013 | Kim ...................... B60J 3/0243 160/127 |
| 2014/0039730 A1 | 2/2014 | Loubiere |
| 2014/0320946 A1* | 10/2014 | Tomkins .................... B60J 3/04 359/275 |
| 2017/0080782 A1 | 3/2017 | Spencer |
| 2018/0300897 A1* | 10/2018 | Woods ................... G06F 3/011 |

FOREIGN PATENT DOCUMENTS

| | | |
|---|---|---|
| CN | 206938400 U | 1/2018 |
| CN | 108583237 A | 9/2018 |
| DE | 102004007521 A1 | 2/2005 |
| DE | 102008052761 A1 | 4/2010 |
| DE | 102013010454 A1 | 12/2014 |
| DE | 102014206202 A1 | 10/2015 |
| JP | 2002087060 A | 3/2002 |
| JP | 2002331835 A | 11/2002 |
| JP | 2018095158 A | 6/2018 |
| KR | 20170029057 A | 3/2017 |
| WO | 2016119763 A1 | 8/2016 |
| WO | 2017134629 A1 | 8/2017 |
| WO | 2017219728 A1 | 12/2017 |

* cited by examiner

VEHICLE MOUNTED VIRTUAL VISOR
SYSTEM AND METHOD THEREOF

This application claims the benefit of priority of U.S. provisional application Ser. No. 62/490,805, filed on Apr. 27, 2017, the disclosure of which is herein incorporated by reference in its entirety.

FIELD

This disclosure relates generally to anti-glare systems and, more particularly, to methods and systems for dynamically adaptive to changing lighting conditions impinging on a target inside a vehicle.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a system for a vehicle comprises a medium arranged in front of a target in the vehicle, a target monitoring system arranged in front of the target in the vehicle capturing an image or a profile of the target, and a processing unit communicatively coupled the target monitoring camera to the medium, analyzed the captured image or profile of the target, wherein the processing unit arranged to analyze the obtained images or profile of the target and cause the medium to switch from a transparent mode to an opaque mode. The images or profile of the target captured by target monitoring system is at least one of an upper body of the target or a facial profile of the target, is a camera. The processing unit further determined a path of a target's eye view, configured to selectively block out light sources in the path of the target's eye view and switched the medium to a substantially opaque optical characteristic. The medium is at least one of a LCD screen, glass, or plastic. The path of the target's eye view described above is a line of sight to the medium.

According to another aspect of the disclosure, there is provided a non-transitory computer readable medium having stored thereon a computer program for controlling an optical characteristics of a LCD screen, the computer program comprising a routine of set instructions for causing the machine to perform: determining face location and pose estimation within an image captured by a camera, determining changes in an illumination level on the face location, and changing an optical characteristic of the LCD screen overlapping the face location. The determining changes in the illumination level on the face location further comprises determining changing lighting from an environment and an optical characteristic of the LCD screen. The non-transitory computer readable medium further comprises projecting an array of patterns on the LCD screen, detecting further changes in the illumination level on a target's eye, identifying the patterns projected on the target's eye, and changing the optical characteristic of the projected patterns on the LCD screen overlapping the target's eye. The non-transitory computer readable medium further comprises selectively changing a portion of the LCD screen including an opaque characteristic overlapping the target's eye, wherein the portion of the LCD screen comprises the projected patterns. The non-transitory computer readable medium further comprises continuously updating projection mapping and facial illumination estimation in real-time when detecting changes of face location and pose estimation.

According to another aspect of the disclosure, there is provided a computer program product embodying the computer readable medium.

According to another aspect of the disclosure, there is provided an apparatus comprises a processor and a memory including computer program instructions. The memory and the computer program instructions configured to, with the processor, cause the apparatus at least to perform: capture an image or a profile of the target, detect changes in an illumination level on captured image or the profile of the target, and change a LCD screen from a transparent characteristics mode to an optical characteristics mode when the detected changes in the illumination level exceeding a threshold, wherein the image or the profile of the target is captured by a camera. The LCD screen arranged in front of the target in a vehicle configured to change from the transparent characteristics mode to the optical characteristics mode when the detected changes in the illumination level exceeding a threshold.

According to another aspect of the disclosure, there is provided a method for controlling an optical characteristics of a LCD screen positioned in front of a target in a vehicle, the method comprises determining face location and pose estimation of the target within an image captured by a camera, determining changes in an illumination level on the face location, and changing an optical characteristic of the LCD screen overlapping the face location. The method of determining changes in the illumination level on the face location further comprises determining changing lighting from an environment and an optical characteristic of the LCD screen. The method further comprises projecting an array of patterns on the LCD screen, detecting further changes in the illumination level on a target's eye, identifying the patterns projected on the target's eye, and changing the optical characteristic of the projected patterns on the LCD screen overlapping the target's eye.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
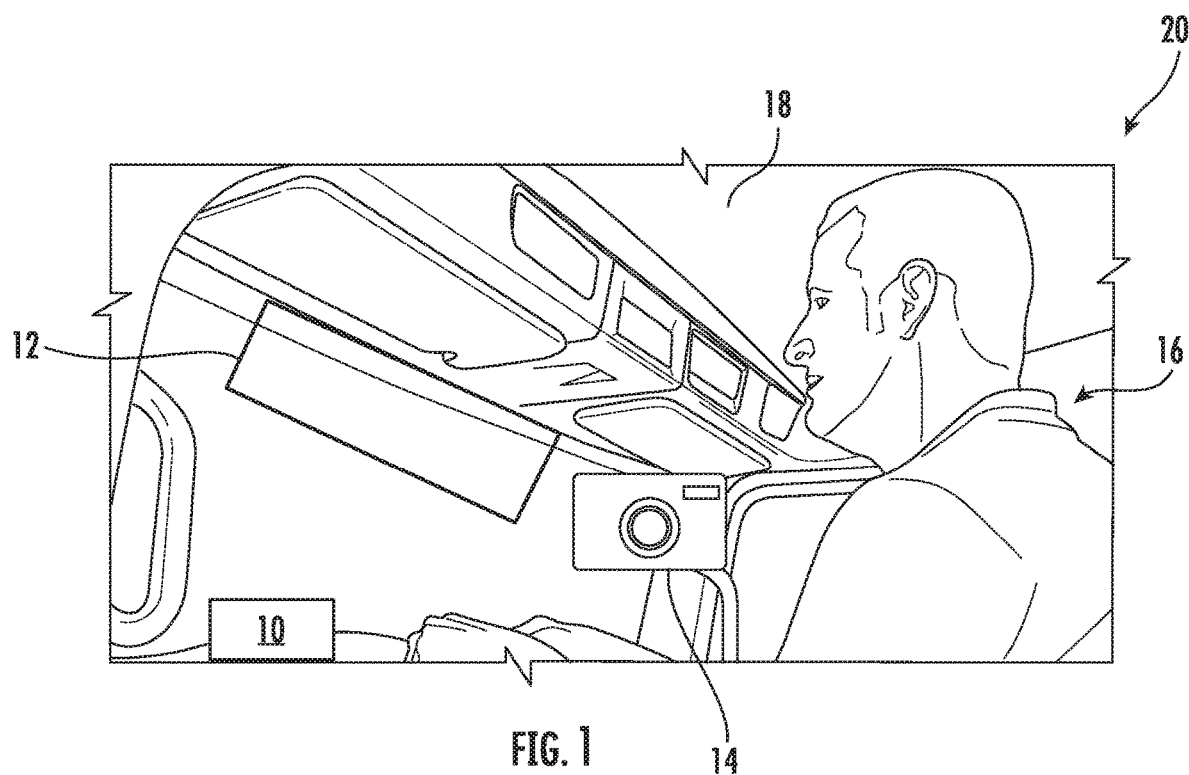
FIG. 1 is a side view, with certain portions removed or cut away, of a portion of a driver compartment of a vehicle showing an exemplary embodiment of a vehicle mounted virtual visor system.

FIG. 1 illustrates a system 20 according to an embodiment of a disclosure. The system 20 comprises a processor 10, a camera 12, a LCD screen 14 arranged in front of a target such as a driver 16 in a vehicle 18. The system 20 may comprise other circuitry, a memory, or a computer implemented module. The processor 10 control the LCD screen 14 and the camera 12 and can read to and write from the memory. The memory stores computer program instructions that control the camera 12 and the LCD screen 14. The computer program instructions provide the logic and routines that enable the system to capture an image or a profile of the target, detect changes in an illumination level on captured image or the profile of the target, and change the LCD screen from a transparent characteristics mode to an optical characteristics mode when the detected changes in the illumination level exceeding a threshold.

The camera 12 is mounted in a location which has a clear view of the driver's face, for example. The processor, in one embodiment, is an imaging processing unit configured to analyze the images of the driver to determine if partial or all of the LCD screen should be change or switch between transparent optical characteristics and opaque optical characteristics. In some embodiments, the imaging processing unit is configured to change from transparent optical characteristics to opaque optical characteristics to block light sources having high intensity from disrupting the driver's view. The system 20 is selectively block out sources of glare from a driver's eyes. As an example, a section of the LCD screen overlapping the driver's view is changed to the opaque optical characteristics mode while the rest of the LCD screen outside the changed section remains in a transparent optical characteristics.

The vehicle 20 may be a passenger vehicle, a commercial vehicle, an off-highway vehicle, and a recreational vehicle.

Figure 2A:
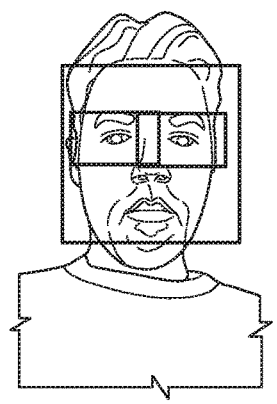
FIGS. 2A and 2B are sampled of front views of the driver taken by a camera.
Figure 2B:
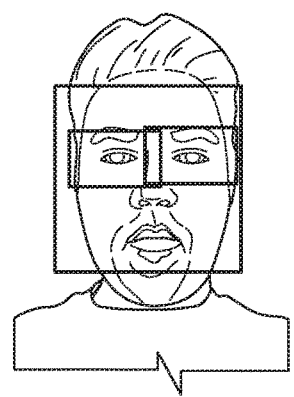

FIGS. 2A and 2B illustrate front views of the driver taken by a camera 14 of a system 20 as illustrated in FIG. 1. In one embodiment, a non-transitory computer readable medium having stored thereon a computer program for controlling an optical characteristics of a LCD screen. The computer program comprises a routine of set instructions for causing the machine to perform: determining face location and pose estimation within an image captured by a camera as illustrated in FIG. 2A. Now referring to FIG. 2B, the computer program further comprises determining changes in an illumination level on the face location. In one embodiment, a baseline illumination for the face is determined. Over a period of time, the computer program continue to detect changes in the illumination level, both from a changing lighting environment and from changing in the optical characteristics levels of the LCD screen. As illustrated in FIG. 2B, the illumination around the eyes of the driver changes when the light source is obstructed. In other embodiment, the illumination property varies depending on input perimeters such as human skin color, eye color, facial hair, facial features, and so forth. In another embodiment, the driver wearing for example a sun glasses, an eye glasses, a hat, a scarfs, or other suitable obstructions may change the illumination property level.

Figure 3A:
FIGS. 3A-3C are sampled views of the driver incorporating a described embodiment of the disclosure.
Figure 3B:
Figure 3C:

FIGS. 3A-3C illustrate various views of the driver. Once the base illumination level of the face is identified, a visor projection mapping onto the driver face is performed. The non-transitory computer readable medium further comprises projecting an array of patterns on the LCD screen, detecting further changes in the illumination level on a target's eye, identifying the patterns projected on the target's eye, and changing the optical characteristic of the projected patterns on the LCD screen overlapping the target's eye. The non-transitory computer readable medium further selectively changes a portion of the LCD screen including an opaque characteristic overlapping the target's eye. In one embodiment, the portion of the LCD screen comprises at least either a portion or all of the projected patterns. Once the projection mapping data becomes available, the non-transitory computer readable medium continuously updates projection mapping and facial illumination estimation in real-time when detecting changes of face location and pose estimation.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for a vehicle, the system comprising:
   a medium arranged in front of a target person in the vehicle;
   a target monitoring system arranged in front of the target person in the vehicle and configured to capture images of a face of the target person; and
   a processor communicatively coupled with the target monitoring system and with the medium, the processor configured to:
   receive images of the face from the target monitoring system;
   determine a location and a pose of the face based on the images of the face;
   operate a portion of the medium in an opaque mode to project an illumination pattern onto the face;
   detect the illumination pattern on the face in the images of the face;
   determine (i) a projection mapping of portions of the medium onto corresponding portions of the face based on the illumination pattern detected on the face and (ii) continuously update the projection mapping based on changes in the location and the pose of the face; and
   selectively operate portions of the medium in the opaque mode to block a light passing through the medium onto eyes of the target person based on the projection mapping and the location and the pose of the face.

2. The system of claim 1, wherein the target monitoring system is a camera.

3. The system of claim 1, wherein the processor is further configured to determine a path of an eye view of the target person.

4. The system of claim 3, wherein the processor is further configured to operate the medium to selectively block out light sources in the path of the eye view by switching the medium to have a substantially opaque optical characteristic.

5. The system of claim 1, wherein the medium is at least one of a LCD screen, glass, and plastic.

6. The system of claim 3, wherein the path of the eye view is a line of sight to the medium.

7. A non-transitory computer readable medium having stored thereon a computer program for controlling optical characteristics of a LCD screen arranged in front of a target person in a vehicle, the computer program comprising program instructions configured to, when executed, cause a computer to:
   receive images from a target monitoring system that is arranged in front of the target person in the vehicle and configured to capture images of a face of the target person;
   determine a location and a pose of the face based on the images;
   operate a portion of the medium in an opaque mode to project an illumination pattern onto the face;
   detect the illumination pattern on the face in the images of the face;
   determine (i) a projection mapping of portions of the LCD screen onto corresponding portions of the face based on the illumination pattern detected on the face and (ii) continuously update the projection mapping based on changes in the location and the pose of the face; and
   selectively operate portions of the LCD screen in the opaque mode to block a light passing through the LCD screen onto eyes of the target person based on the projection mapping and the location and the pose of the face.

8. The non-transitory computer readable medium of claim 7, the computer program being further configured to, when executed, cause the computer to:
   determine a change in lighting from an environment and an optical characteristic of the LCD screen.

9. The non-transitory computer readable medium of claim 7, wherein a portion of the LCD screen comprises the projected patterns.

10. An apparatus for controlling optical characteristics of a LCD screen arranged in front of a target person in a vehicle, the apparatus comprising:
    a processor; and
    memory that stores computer program instructions configured to, when executed, cause the processor to:
    receive images from a target monitoring system that is arranged in front of the target person in the vehicle and configured to capture images of a face of the target person;
    determine a location and a pose of the face based on the images;
    operate a portion of the medium in an opaque mode to project an illumination pattern onto the face;
    detect the illumination pattern on the face in the images of the face;
    determine (i) a projection mapping of portions of the LCD screen onto corresponding portions of the face based on the illumination pattern detected on the face and (ii) continuously update the projection mapping based on changes in the location and the pose of the face; and
    selectively operate portions of the LCD screen in the opaque mode to block a light passing through the LCD screen onto eyes of the target person based on the projection mapping and the location and the pose of the face.

11. The apparatus of claim 10 wherein the target monitoring system is a camera.

12. A method for controlling optical characteristics of a LCD screen arranged in front of a target person in a vehicle, the method comprising:
    receiving images from a target monitoring system that is arranged in front of the target person in the vehicle and configured to capture images of a face of the target person;
    determining a location and a pose of the face based on the images;

operating a portion of the medium in an opaque mode to project an illumination pattern onto the face;

detect the illumination pattern on the face in the images of the face;

determining (i) a projection mapping of portions of the LCD screen onto corresponding portions of the face based on the illumination pattern detected on the face and (ii) continuously update the projection mapping based on changes in the location and the pose of the face; and selectively operating portions of the LCD screen in the opaque mode to block a light passing through the LCD screen onto eyes of the target person based on the projection mapping and the location and the pose of the face.

13. The method of claim 12 further comprising:

determining a change in lighting from an environment and an optical characteristic of the LCD screen.

* * * * *